(12) United States Patent
Dosluoglu

(10) Patent No.: US 8,213,710 B2
(45) Date of Patent: Jul. 3, 2012

(54) APPARATUS AND METHOD FOR SHIFT INVARIANT DIFFERENTIAL (SID) IMAGE DATA INTERPOLATION IN NON-FULLY POPULATED SHIFT INVARIANT MATRIX

(75) Inventor: Taner Dosluoglu, Kirchheim/Teck-Nabern (DE)

(73) Assignee: Youliza, Gehts B.V. Limited Liability Company, Dover, DE (US)

( * ) Notice: Subject to any disclaimer, the term of this patent is extended or adjusted under 35 U.S.C. 154(b) by 1040 days.

(21) Appl. No.: 11/998,127

(22) Filed: Nov. 28, 2007

(65) Prior Publication Data

US 2008/0124001 A1 May 29, 2008

Related U.S. Application Data

(60) Provisional application No. 60/861,389, filed on Nov. 28, 2006, provisional application No. 60/861,699, filed on Nov. 29, 2006.

(51) Int. Cl.
*G06K 9/00* (2006.01)

(52) U.S. Cl. ........ 382/162; 382/167; 382/192; 382/300; 382/276; 358/1.9; 358/505; 358/509; 358/513; 358/514

(58) Field of Classification Search .................. 382/162, 382/190, 192, 276, 277, 312, 300; 348/203.1, 348/236, 237, 238, 272, 294, 298, 308; 358/1.9, 358/505, 509, 513, 514
See application file for complete search history.

(56) References Cited

U.S. PATENT DOCUMENTS

| | | | |
|---|---|---|---|
| 3,971,065 A | 7/1976 | Bayer | |
| 4,093,874 A | 6/1978 | Pollitt | |
| 5,949,483 A | 9/1999 | Fossum et al. | |
| 6,104,844 A | 8/2000 | Alger-Meunier | |
| 6,493,029 B1* | 12/2002 | Denyer et al. | 348/236 |
| 6,507,364 B1* | 1/2003 | Bishay et al. | 348/242 |
| 6,618,503 B2* | 9/2003 | Hel-or et al. | 382/167 |
| 6,690,424 B1 | 2/2004 | Hanagata et al. | |
| 6,801,719 B1 | 10/2004 | Szajewski et al. | |
| 6,822,758 B1 | 11/2004 | Morino | |
| 6,831,692 B1 | 12/2004 | Oda | |
| 6,903,754 B2 | 6/2005 | Brown Elliott | |
| 7,049,860 B2 | 5/2006 | Gupta | |
| 7,119,903 B1* | 10/2006 | Jones | 356/446 |

(Continued)

OTHER PUBLICATIONS

Co-Pending US Patent D106-002, U.S. Appl. No. 11/998,099, filed Nov. 28, 2007, "An Apparatus and Method for Shift Invariant Differential (SID) Image Interpolation in Non-Fully Populated Shift Invariant Matrix," assigned to the same assignee as the present inventon.

(Continued)

*Primary Examiner* — Brian Q Le
*Assistant Examiner* — Mekonen Bekele
(74) *Attorney, Agent, or Firm* — Stolowitz Ford Cowger LLP

(57) ABSTRACT

An image processing system interpolates image data of an image array by ascertaining shift invariant points and non-shift invariant points within the array. The average illumination and the second order derivative are determined for the shift invariant locations. The second order derivative and the intensity at the non-shift invariant locations for each of the non-shift invariant points are estimated. The color data for each color element is determined from the image data and second order derivative. The second order derivative is multiplied by a scaling factor for selectively smoothing and sharpening the second order derivative. The color data values of adjacent color element to enhance a resolution of the image data.

40 Claims, 9 Drawing Sheets

U.S. PATENT DOCUMENTS

| | | | |
|---|---|---|---|
| 7,280,141 B1 * | 10/2007 | Frank et al. | 348/243 |
| 7,440,016 B2 * | 10/2008 | Keshet et al. | 348/280 |
| 7,460,688 B2 | 12/2008 | Stanback et al. | |
| 7,479,994 B2 | 1/2009 | Yang et al. | |
| 7,511,749 B2 | 3/2009 | Gruhlk et al. | |
| 7,515,183 B2 | 4/2009 | Yang et al. | |
| 7,548,261 B2 * | 6/2009 | Yang et al. | 348/241 |
| 7,561,189 B2 | 7/2009 | Chein et al. | |
| 7,639,291 B2 * | 12/2009 | Lim et al. | 348/243 |
| 2003/0169353 A1 * | 9/2003 | Keshet et al. | 348/272 |
| 2003/0227311 A1 | 12/2003 | Ranganathan | |
| 2005/0031222 A1 * | 2/2005 | Hel-Or | 382/260 |
| 2006/0113459 A1 * | 6/2006 | Yang et al. | 250/208.1 |

OTHER PUBLICATIONS

"Pixel-Level Image Fusion: The Case of Image Sequences", Rockinger et al., Proceeding of SPIE (The international Society for Optical Engineering), Signal Processing, Sensor Fusion, and Target Recognition VII, vol. 3374, pp. 378-388, Jul. 1998.

"Method of Color Interpolation in a Single Color Camera Using Green Channel Separation," Weerasinghe, et al., IEEE International Conference on Acoustics, Speech, and Signal Processing, 2002, vol. 4, pp. IV-3233-IV-3236, 2002.

"The Canonical Correlations of Color Images and Their Use for Demosaicing," Hel-Or, Hewlett Packard Laboratories, HPL-2003-164R1, Feb. 23, 2004, found: Mar. 29, 2006 at www.hpl.hp.com/techreports/2003/HPL-2003-164R1.pdf.

"Local Image Reconstruction and Sub-pixel Restoration Algorithms," Boult et al., Computer Vision, Graphics, and Image Processing: Graphical Models and Image Processing, vol. 55, No. 1, 1993, pp. 63-77, Academic Press, Inc., Orlando, FL.

"Image Capture: Modeling and Calibration of Sensor Responses and Their Synthesis from Multispectral Images," Vora et al., Hewlett Packard Laboratories, HPL-98-187, found Mar. 29, 2006 at http://www.hpl.hp.com/techreports/98/HPL-98-187.pdf.

Image processing, Typical operations, from Wikipedia, the free encyclopedia, found: http://en.wikipedia.org/wiki/Image_processing, Oct. 2008.

Image processing, Solution Methods, from Wikipedia, the free encyclopedia, Commonly Used Signal Processing Techniques, found: http://web.archive.org/web/20051218193836/http://en.wikipedia.org/wiki/Image-processing, Dec. 18, 2005.

Stolowitz Ford Cowger LLP; Related Case Listing; May 18, 2011; 1 Page.

* cited by examiner

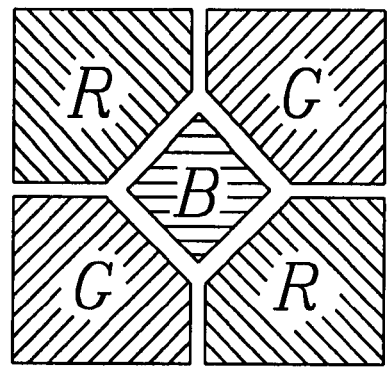
FIG. 1a – Prior Art
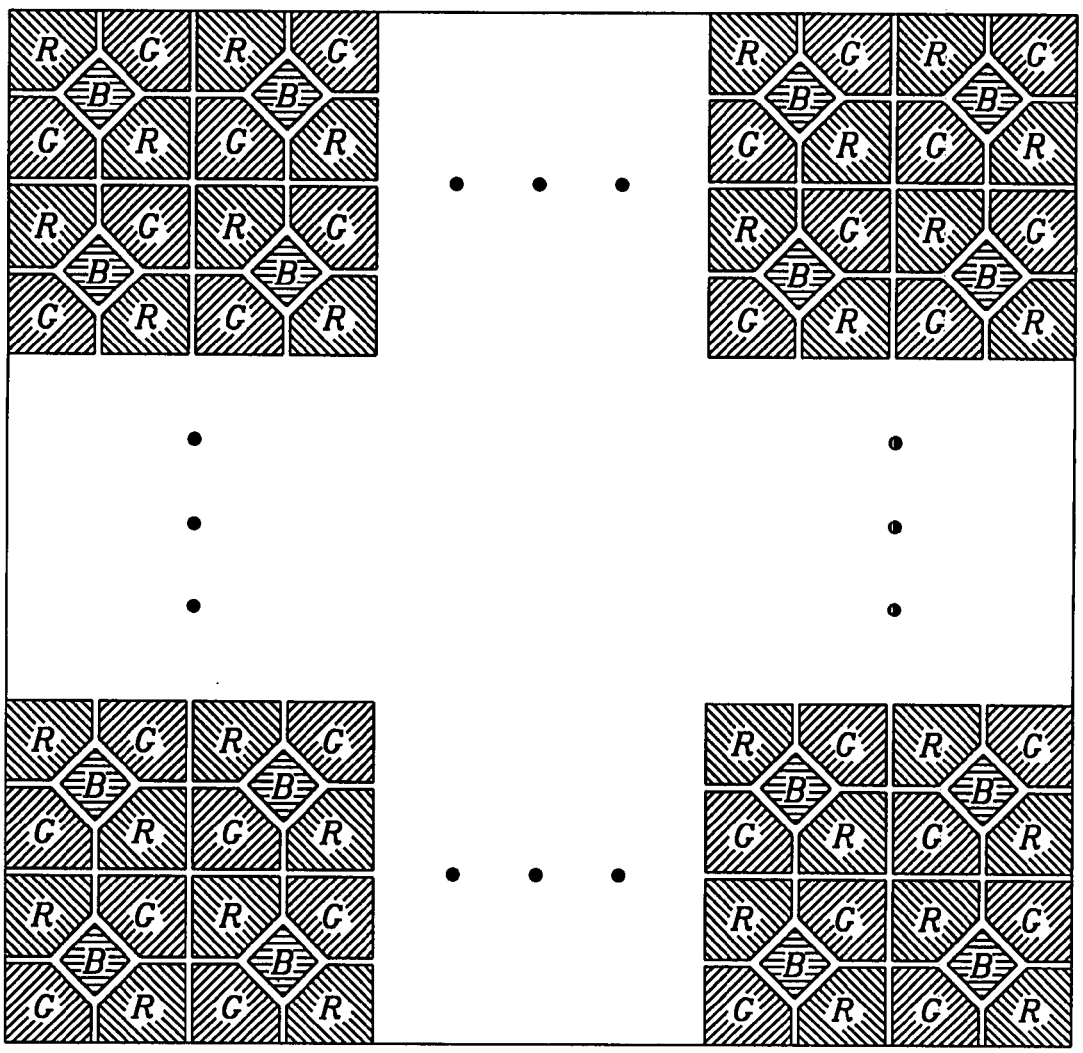
FIG. 1b – Prior Art

APPARATUS AND METHOD FOR SHIFT INVARIANT DIFFERENTIAL (SID) IMAGE DATA INTERPOLATION IN NON-FULLY POPULATED SHIFT INVARIANT MATRIX

This application claims priority under 35 U.S.C. §119 to U.S. Provisional Patent Application Ser. No. 60/861,389, filed on Nov. 28, 2006, and Application Ser. No. 60/861,699, filed on Nov. 29, 2006, which are herein incorporated by reference in their entirety.

RELATED PATENT APPLICATIONS

"An Apparatus and Method for Shift Invariant Differential (SID) Image Data Interpolation in Fully Populated Shift Invariant Matrix", patent application Ser. No. 11/998,099, filed on Nov. 28, 2007, assigned to the same assignee as this invention and incorporated herein by reference in its entirety

BACKGROUND OF THE INVENTION

1. Field of the Invention

This invention relates generally to image processing methods and apparatus. More particularly, this invention relates to image processing methods and apparatus for interpolation of image data for adapting to various edges and shapes that might interfere with the uniform illumination and cause color shifts. Even more particularly, this invention relates to image processing methods and apparatus that employ a second order derivative calculated at shift invariant points of a mosaic structured color element array to determine color values independent of the location chosen at intervals of maximum spatial sampling frequency, where the mosaic structured color element array does not have a fully populated shift invariant matrix.

2. Description of Related Art

A digital image is an electronic signal representing the intensity or intensity of light reflected or originating from an object impinging upon a sensor. The light is converted within the sensor to an electronic signal. In an image sensor array the electronic signal is contains information detailing the intensity of the light impinging upon a two-dimensional array. Thus the electronic signal contains the intensity of each point having a sensor within the array as defined as a function of two spatial variables. Further, each point having a sensor is considered a sampling point and the space between each of the sensors determines the maximum spatial sampling frequency of the image. Thus projected images of these sensor outputs such as photographs, still video images, radar images, etc. are a function of the spatial variables (x, y), therefore the image intensity is defined as f(x,y).

U.S. Pat. No. 6,822,758 (Morino) describes an image processing method for improving a defective image (degraded image) using color interpolation and optical correction.

"Pixel-Level Image Fusion: The Case of Image Sequences", Rockinger, et al, Proceedings of SPIE (The International Society for Optical Engineering), Signal Processing, Sensor Fusion, and Target Recognition VII, Vol. 3374, pp.: 378-388, July 1998, provides a pixel-level image sequence fusion with an approach based on a shift invariant extension of the 2D discrete wavelet transform. The discrete wavelet transform yields an over-complete and thus shift invariant multi-resolution signal representation.

"Method of Color Interpolation in A Single Sensor Color Camera Using Green Channel Separation", Weerasinghe, et al, IEEE International Conference on Acoustics, Speech, and Signal Processing, 2002, Vol.: 4, pp.: IV-3233-IV-3236 presents a color interpolation algorithm for a single sensor color camera. The proposed algorithm is especially designed to solve the problem of pixel crosstalk among the pixels of different color channels. Inter-channel crosstalk gives rise to blocking effects on the interpolated green plane, and also spreading of false colors into detailed structures. The proposed algorithm separates the green channel into two planes, one highly correlated with the red channel and the other with the blue channel. These separate planes are used for red and blue channel interpolation.

"The Canonical Correlations of Color Images and Their Use for Demosaicing", Hel-Or, Hewlett Packard Laboratories, HPL-2003-164R1, Feb. 23, 2004, found: Mar. 29, 2006 at www.hpl.hp.com/techreports/2003/HPL-2003-164R1.pdf, describes a demosaicing technique that is derived directly from statistical inferences on color images for demosaicing color image de-noising, compression, and segmentation. The technique presents a new Bayesian approach that better exploits the spectral dependencies in color images. It takes advantage of the fact that spatial discontinuities in different color bands are correlated and that this characteristic is efficiently exposed using the Canonical Correlation Analysis (CCA). The CCA scheme aims attending the optimal representation of each color band such that color plane correlation is maximized.

"Local Image Reconstruction and Sub-pixel Restoration Algorithms", Boult et al, Computer Vision, Graphics, and Image Processing: Graphical Models and Image Processing, Vol.: 55, No.: 1, 1993, pp.: 63-77, Academic Press, Inc., Orlando, Fla., introduces a new class of reconstruction algorithms that treat image values as area samples generated by non-overlapping integrators. This is consistent with the image formation process, particularly for CCD and CID cameras. Image reconstruction is a two-stage process: image restoration followed by application of the point spread function (PSF) of the imaging sensor.

"Image Capture: Modeling and Calibration of Sensor Responses and Their Synthesis from Multispectral Images", Vora, et al, Hewlett Packard Laboratories, HPL-98-187, found Mar. 29, 2006 at http://www.hpl.hp.com/techreports/98/HPL-98-187.pdf, models for digital cameras, methods for the calibration of the spectral response of a camera and the performance of an image capture simulator. The general model underlying the simulator assumes that the image capture device contains multiple classes of sensors with different spectral sensitivities and that each sensor responds in a known way to light intensity over most of its operating range.

SUMMARY OF THE INVENTION

An object of this invention is to provide a system that interpolates image data using a second order derivative at a shift invariant point or an estimated second order derivative of non-shift invariant points within a cluster of color elements to prevent uniform illumination interference and color shifting from various edges and shapes within an image.

Another object of this invention is to provide a system that estimates a second order derivative of non-shift invariant points within a cluster of color elements from neighboring second order derivative values of shift invariant points Further, another object of this invention is to scale the second order derivative to smooth or sharpen the image.

Still further, another object of this invention is to sharpen the color data derived from the second order derivative.

To accomplish at least one of these objects, an image processing system for interpolating image data of an array of color elements is comprised of a shift invariant point determining device, an illumination averager, a second order differentiator, a non-shift invariant point estimator, and color data calculator. The shift invariant point determining device ascertains shift invariant points at the interstitial spaces between color elements of the array of color elements. The array of color elements is organized in an array to form an image and the image data contains illumination values for each of the plurality of color elements.

The illumination averager is in communication with the shift invariant point determining device to receive the shift invariant points and with the raw image data determines average illumination values of clusters of a plurality of color elements that surround the shift invariant points. The second order differentiator is in communication with the shift invariant point determining device to receive the shift invariant points and with the illumination averager to receive the average illumination values for the clusters of the plurality of color elements at the shift invariant points. From the shift invariant points and the average illumination values, the second order differentiator determined a second order derivative of the average illumination values of the clusters of the plurality of color elements at the shift invariant points.

The non-shift invariant point estimator determines the non-shift invariant points within the array of color elements. The non-shift invariant point estimator is in communication with the illumination averager to receive the average illumination values of clusters of a plurality of color elements at the shift invariant points and in communication with the second order differentiator to receive the second order derivative of the average illumination values of the clusters of the array of color elements at the shift invariant points. from the average illumination values and the second order derivative of the shift invariant points to generate an estimated second order derivative and estimated average illumination for the non-shift invariant points at the interstitial spaces between the color elements.

The color data calculator receives the image data and in communication with the second order differentiator and the non-shift invariant point estimator to receive the second order derivative and the estimated second order derivative. The color data calculator determines color data for each color element of the array of color elements from the image data, second order derivative, the estimated second order derivate. The image processing system also has a color data averager that is in communication with the color data calculator to average color data values of adjacent color elements to improve a resolution of the image data. The color data calculator determines the color data by the formula:

$$l_{cx}(2i,2j) = l_{cx}(2i-l,2j-m) + l(2i,2j)/2 - l(2i-2*l, 2j-2*m)/2 - l(2i,2j)''/8,$$

where:

x is the designation of the color element type, l and m are +/−1 depending on color element type.

The color data averager determines the average color data values by the formula:

$$\overline{I_c(2i-1, 2j-1)} = \frac{\sum_{x=0}^{1} \sum_{y=0}^{1} l_c((2*(i-x)-2), (2*(j-y)-2))}{4}$$

$$C = Ca, Cb, Cc, Cd$$

where:

$\overline{I_c(2i-1, 2j-1)}$ is the average color data, $l_c((2*(i-x)-2), (2*(j-y)-2))$ is the calculated color data for each junction of one color element (C), and x and y are counting variables for the respectively dimensions i, and j of the plurality of color elements.

A raw image data memory receives and retains the image data upon request from the illumination averager transfers the image data to the illumination averager. An average illumination data memory upon request from the illumination averager receives and retains the average illumination values of the clusters.

The shift invariant point determining device ascertains shift-invariance of a point within the color filter array pattern is satisfied by the logical statement:

IF $l(n,m) = T[a*X1(n,m) + b*X2(n,m) + c*X3(n,m) + d*X4(n,m)]$

THEN $l(n-k, m-l) = T[a*X1(n-k, m-l) + b*X2(n-k, m-l) + c*X3(n-k, m-l) + d*X4(n-k, m-l)]$ where:

l(n,m) is the intensity of an element n,m of the color filter array pattern;

T is a function of the variables of each element of the color filter array pattern;

X1, . . . , Xn are the elements for each row of the color filter array pattern;

n and m are discreet values 1, . . . , N and 1, . . . , M that identifies the location of an element within the color filter array pattern having dimensions N×M;

k and l are incremental counting values that identifies the location of an element within the color filter array pattern a distance k and l from element n and m of the color filter array pattern.

a, b, c, and d are scaling factors for the elements X1, . . . , Xn.

The image processing system additionally has a second derivative scaler. The second derivative scaler is in communication with the second order differentiator to receive the second order derivative. To selectively smooth and sharpen the second order derivative, the second order derivative is multiplied by a scaling factor. The second derivative scaler determines the smoothed and sharpened second order derivative by the formula:

$$\overline{Iss}'' = \frac{\overline{I(i,j)}''}{Scale\_Sharp\_Smooth}$$

where:

$\overline{Iss}''$ is the smoothed and sharpened second order derivative, $\overline{I(i,j)}''$ is the second order derivative, and Scale_Sharp_Smooth is the scaling factor.

The illumination averager determines the average illumination values by averaging the illumination values for color elements surrounding each of the shift invariant points. The average illumination values are determined by the formula:

$$\overline{I(i,j)} = \frac{\sum_{x=0}^{1} \sum_{y=0}^{1} I(i + (2x-1), j + (2y-1))}{4}$$

where:

$\overline{I(i,j)}$ is the average illumination value of the color elements within the cluster surrounding the shift invariant points (i,j), l(i+(2x−1), j+(2y−1)) is the illumination of the color elements within the cluster surrounding the shift invariant points (i,j), and x and y are counting variables to describe the locations of the color elements within the cluster surrounding the shift invariant points (i,j).

The second order differentiator determines second order derivative for each shift invariant point by the formula:

$$l(i,j)''=2*[(\text{Average Peripheral Pixels})-(\text{Average Center Cluster Pixels})]$$

where:

l(i,j)" is the second order derivative shift invariant points (i,j).

Alternately, the second order differentiator determines second order derivative of each shift invariant point by the formula:

$$I(i, j)'' = \frac{\sum_{x=0}^{1}\sum_{y=0}^{1} I(i+(4x-2), j+(4y-2))}{2-2*(I(i, j))}$$

Where:

l(i,j)" is the second order derivative shift invariant points (i,j), l(i+(4x−2), j+(4y−2)) is the illumination of the color elements within the cluster surrounding the shift invariant points (i,j), and x and y are counting variables to describe the locations of the color elements within the cluster surrounding the shift invariant points (i,j).

The non-shift invariant point estimator ascertains non-shift-invariance of a point within the color filter array pattern by satisfying the logical statement:

IF $l(n,m) \neq T[a*X1(n,m)+b*X2(n,m)+c*X3(n,m)+d*X4(n,m)]$

THEN $l(n-k,m-l) \neq T[a*X(n-k,m-l)+b*X2(n-k,m-l)+c*X3(n-k,m-l)+d*X4(n-k,m-l)]$ where:

l(n,m) is the intensity of an element n,m of the color filter array pattern;

T is a function of the variables of each element of the color filter array pattern;

X1, . . . , Xn are the elements for each row of the color filter array pattern;

n and m are discreet values 1, . . . , N and 1, . . . , M that identifies the location of an element within the color filter array pattern having dimensions N×M;

k and l are incremental counting values that identifies the location of an element within the color filter array pattern a distance k and l from element n and m of the color filter array pattern.

a, b, c, and d are scaling factors for the elements X1, . . . , Xn.

The non-shift invariant point estimator determines an estimated second order differential for each non-shift invariant point as an average of the second order differentials for all the shift invariant points surrounding the non-shift invariant point. Further, the non-shift invariant point estimator determines an estimated second order differential for each non-shift invariant point according to the equation $$I(n, m)'' = \frac{[I(n-2, m)'' + I(n+2, m)'' + I(n, m-2)'' + I(n, m+2)'']}{4}$$

where:

l(n,m)" is the estimated second order differential for the non-shift invariant point (m,n), l(n−2,m)"+l(n+2,m)"+l(n,m−2)"+l(n,m+2)" is the sum of the second order differentials of the surrounding shift invariant points.

The non-shift invariant point estimator determines an estimated average illumination value for the non-shift invariant points as the average of the average illumination values of the surrounding shift invariant points as adjusted by the estimated second order differential for the non-shift invariant point and scaled by a factor of a step size distance from the non-shift invariant point to the surrounding shift invariant points. The non-shift invariant point estimator determines an estimated average illumination value for the non-shift invariant points according to the equation:

$$\overline{I(n, m)} = \frac{\overline{I(n-2, m)} + \overline{I(n+2, m)} + \frac{\overline{I(n, m-2)} + \overline{I(n, m+2)}}{4} - \frac{I(n-2, m)''}{2}}{\sqrt{2}}$$

where:

$\overline{I(n,m)}$ is the average illumination value of the non-shift invariant points, and $\overline{I(n-2,m)}+\overline{I(n+2,m)}+\overline{I(n,m-2)}+\overline{I(n,m+2)}$ is the average of the illumination of the shift invariant points surrounding the non-shift invariant point (n,m).

The image processing system further includes an average color data memory device and an output device. The average color data memory device is in communication with the color data averager to receive and retain the average color data values. The output device transfers the average color data values to an external apparatus for further processing.

BRIEF DESCRIPTION OF THE DRAWINGS

FIGS. 1a and 1b are diagrams illustrating a Pentile Matrix patterned color image sensor array of the prior art.

DETAILED DESCRIPTION OF THE INVENTION

Figure 2B:
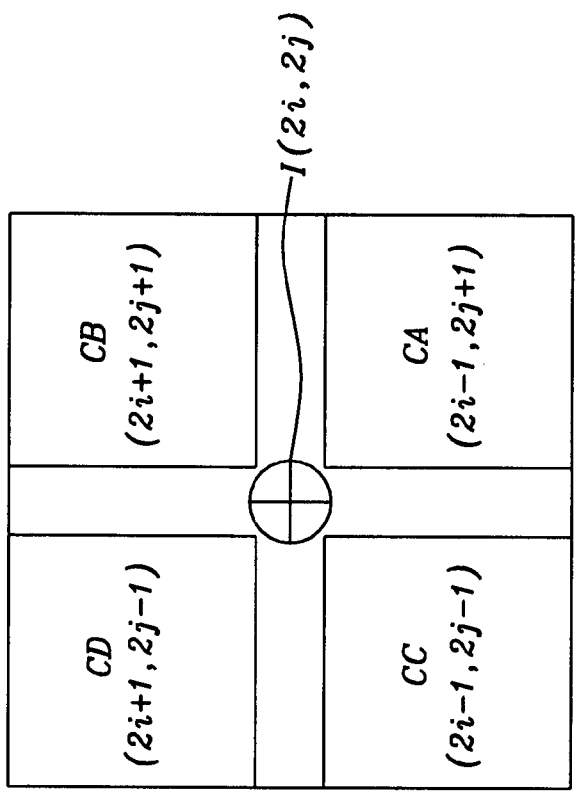
FIGS. 2a and 2b are diagrams of portions of an image array constructed of a patterned array of four color elements illustrating the indexing structure of the apparatus and method of this invention for interpolating image data.

Image sensor elements (either CMOS or Charged Coupled Devices) generally sense light as a grey-scaled value. Alternately, the color element sensor elements, as described, are tuned to be sensitive to a particular hue of the color. If the color element sensor elements sense only grey scale values they require a color filter array to generate the color components that are to be displayed. The color filter mosaic array, such as the Pentile matrix as shown in U.S. Pat. No. 6,903,754 (Brown-Elliott) is an arrangement of color elements for full color imaging devices with simplified addressing, as shown in FIGS. 1a and 1b. The architecture of the array consists of an array of rows and column line architecture for a display. The array consists of a plurality of row and column positions and a plurality of three-color color elements. A three-color color element includes a central blue color element B, a pair of diagonally placed red color elements R, and a pair of diagonally placed green color elements G. The blue color element B is placed in the center of a square formed of the pairs of red R and green color G elements. The pair of red color elements R is on opposing corners of the square and the pair of green color elements G is adjacent to the red color elements R and the other opposing corners of the square.

The color element mosaic pattern of image arrays such as a Pentile matrix introduces a shift-variance. Shift-variance means that the interpolation at a specific spatial location (x, y) is different. That is color data for a specified input RGB(x,y) is not always equal to RGB(x−dx,y−dy), where dx and dy are any integer multiple of the color element pitch. That is if there is an edge or dramatic change of intensity between any two adjacent color elements of the same color, the raw color data does not contain for one of the colors does not contain the precise information for the exact location of the edge and any interpolation for determining intermediate color between the two same color does not determine is the location of the change intensity.

A shift invariant system occurs when identical stimulus is presented to the system except for the corresponding shift in time or space and the response of the system is identical. Mathematically, a system T is shift-invariant if and only if:

$$y(t)=T[x(t)] \text{ implies } y(t-s)=T[x(t-s)]$$

where:
y(t) is the response of the system.
T[x(t)] is the system description.
x(t) is the input stimulus of the system T.
(t−s) is the shift in time or space.

The intensity or magnitude of the color data between two color elements is, as shown above, shift variant. However, the intensity l(x,y) calculated by summing all four adjacent color elements is shift-invariant. That is for a specified input of a four color element cluster of an image array, the intensity is determined by the formula:

$$\sum_{x=0}^{2}\sum_{y=0}^{2} I(x, y) = \sum_{x=0}^{2}\sum_{y=0}^{2} I(x-dx, y-dy)$$

The Red/Green/Blue structure of the Pentile Matrix pattern, as used in CMOS active color element image sensors, results in a periodic structure that is not shift invariant. For an imaging system it is desired to have an output that is shift invariant (i.e. the edges in the picture can be located at anywhere). However, the total illumination intensity at interstitial space between four adjacent color elements of the Pentile Matrix pattern can always be represented by all the elements of the image array that are adjacent. This is true for all interstitial spaces of any 2×2 arrangements of four color elements of the Pentile matrix pattern regardless of the relative position of the color elements with respect to the interstitial space location. Those interstitial spaces not having all the color elements of the image array adjacent are non-shift invariant interstitial spaces or points.

As discussed in the Wikipedia entry on image processing (found May 3, 2006, http://en.wikipedia.org/wiki/Image_processing), image processing provides solutions to such processing as:

geometric transformations (enlargement, reduction, and rotation);
color corrections (brightness and contrast adjustments, quantization, or conversion to a different color space);
registration or alignment of two or more images;
combination of two or more images into an average, blend, difference, or image composite;
interpolation, demosaicing, and recovery of a full image from a RAW image format like a Pentile filter pattern;
segmentation of the image into regions;
image editing and digital retouching; and
extending dynamic range by combining differently exposed images (generalized signal averaging of Wyckoff sets).

For the interpolation, demosaicing, and recovery of a full image, the interpolation algorithms become complicated as they try to adapt to various edges and shapes that might interfere with the uniform illumination and causes color shifts. The apparatus and method of this invention determines the locations of the shift invariant interstitial spaces and the non-shift invariant interstitial spaces of the mosaic structured color filter pattern. The apparatus and method of this invention then calculates the average intensity for locations with a spatial sampling rate that is the minimum color element pitch of the mosaic structured color element array pattern. The average intensity is determined for each shift invariant interstitial space between four adjacent color elements of an array. The apparatus and method of this invention then determines the second order derivative of the average illumination for each of the shift invariant interstitial spaces between each four color elements of the image array. The second order derivative, as calculated at the center shift invariant interstitial space of any 2×2 color element arrangement, is shift invariant when the total illumination is considered.

The second order derivative for non-shift invariant points is estimated as the average second order derivative of the surrounding shift invariant points. The average intensity of each of the non-shift invariant points is estimated as the average of the average intensities of the surrounding shift invariant points as adjusted by the estimated second order derivative for the non-shift invariant points and scaled by a factor of a step size distance from the non-shift invariant point to the surrounding shift invariant points. This second order derivative or the estimated second order derivative is then used together with the adjacent color information to determine the interpolated color information for each of the Pentile pattern color element clusters.

The apparatus and method of this invention further provides sharpening and smoothing of the image by scaling the second order derivative. The calculated color data for the all interstitial spaces adjacent to each color element is averaged to further sharpen the image.

The raw image data with a mosaic structured color element array pattern, such as the Pentile pattern is a two dimensional array. In a two dimensional array has the general mathematical formulation with a function T having the variables x1(n, m) ... xn(n,m). This function l(n,m) has the form written as:

$$l(n,m)=T[a*x1(n,m)+b*x2(n,m)+c*x3(n,m)+d*x4(n,m)+ \ldots z*xn(n,m)]$$

Where:
T is the function of the variables of each element
x1, ..., xn are the elements for each row of the two dimensional array. For the Pentile pattern mosaic structured color element array pattern, each element refers to the original color element data.
n and m are discreet values 1, ..., N and 1, ..., M that identifies the location of an element within the N×M array.

Figure 2A:
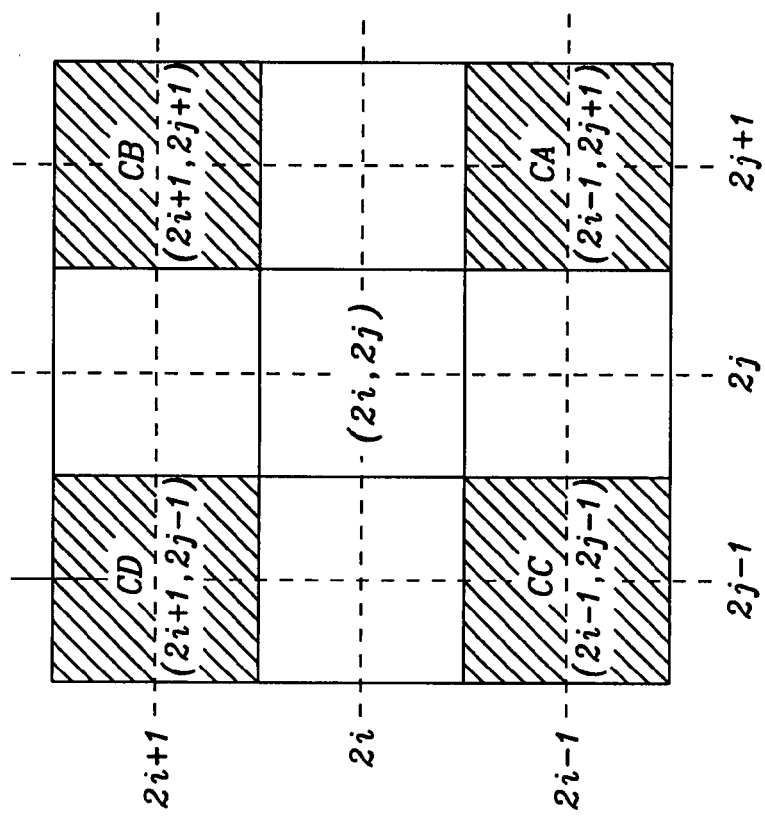

Referring to FIGS. 2a and 2b, if the indices i and j are specified with respect to the elements CA, ..., CD of the matrix. The function l(i,j) satisfies the shift-invariance, as described above, by the logical statement:

$$\text{IF } I(i, j) = T[a * CD(i+1, j-1) + $$
$$b * CB(i+1, j+1) + c * CC(i-1, j-1) + d * CD(i-1, j+1)]$$
$$\text{THEN } I(i-k, j-l) = T[a * CA(i+1-k, j-1-l) + $$
$$b * CB(i+1-k, j+1-l) + $$
$$c * CC(i-1-k, j-1-l) + d * CD(i-1-k, j+1-l)]$$

Where:
k and l are incremental counting values that identifies the location of an element within the I×J array a distance k and l from element i and j of the I×J array.

Alternately, the function l(i,j) satisfies the non-shift-invariance by satisfying the logical statement:

$$\text{IF } I(i, j) \neq T[a * Ca(i+1, j-1) + $$
$$b * Cb(i+1, j+1) + c * Cc(i-1, j-1) + d * Cd(i-1, j+1)]$$
$$\text{THEN } I(i-k, j-l) \neq T[a * Ca(i+1-k, j-1-l) + $$
$$b * Cb(i+1-k, j+1-l) + $$
$$c * Cc(i-1-k, j-1-l) + d * Cd(i-1-k, j+1-l)]$$

Where:
k and l are incremental counting values that identifies the location of an element within the I×J array a distance k and l from element i and j of the I×J array.

This condition is achieved by a=b=c=d (=0.25 in the case of the average). This is a significant departure from a majority of the prior art in this area for mosaic structured color element array patterns. For standard Pentile pattern the color values (Red, Green, Blue, and Cyan of FIG. 2e) are calculated for each location (i−1, j−1, i+1, j−1, i+1, j+1, and i−1, j+1). If one calculates a function of the Red, Green, Blue, and Cyan either by equal Red, Green, Blue and Cyan weighting, the shift-invariance condition given above does not hold. Because of this, the interpolation of the method and apparatus of this invention is specified to the function I (intensity) and does not use luminance. The intensity function is also used in the second order derivative calculation. The second order derivative additionally satisfies the shift-invariance condition above. It is important to note that this second order derivative contains the information about the edges in the image. The edges as specified by the second order derivative are used in the interpolation of the method and apparatus of this invention to correct the adjacent color information with respect to the interstitial location (i,j). In FIG. 2b the distances between the color elements of the 2×2 mosaic structured color filter array to more completely represent the actually distances between the color elements Ca, ..., Cd of the matrix.

Figure 2C:
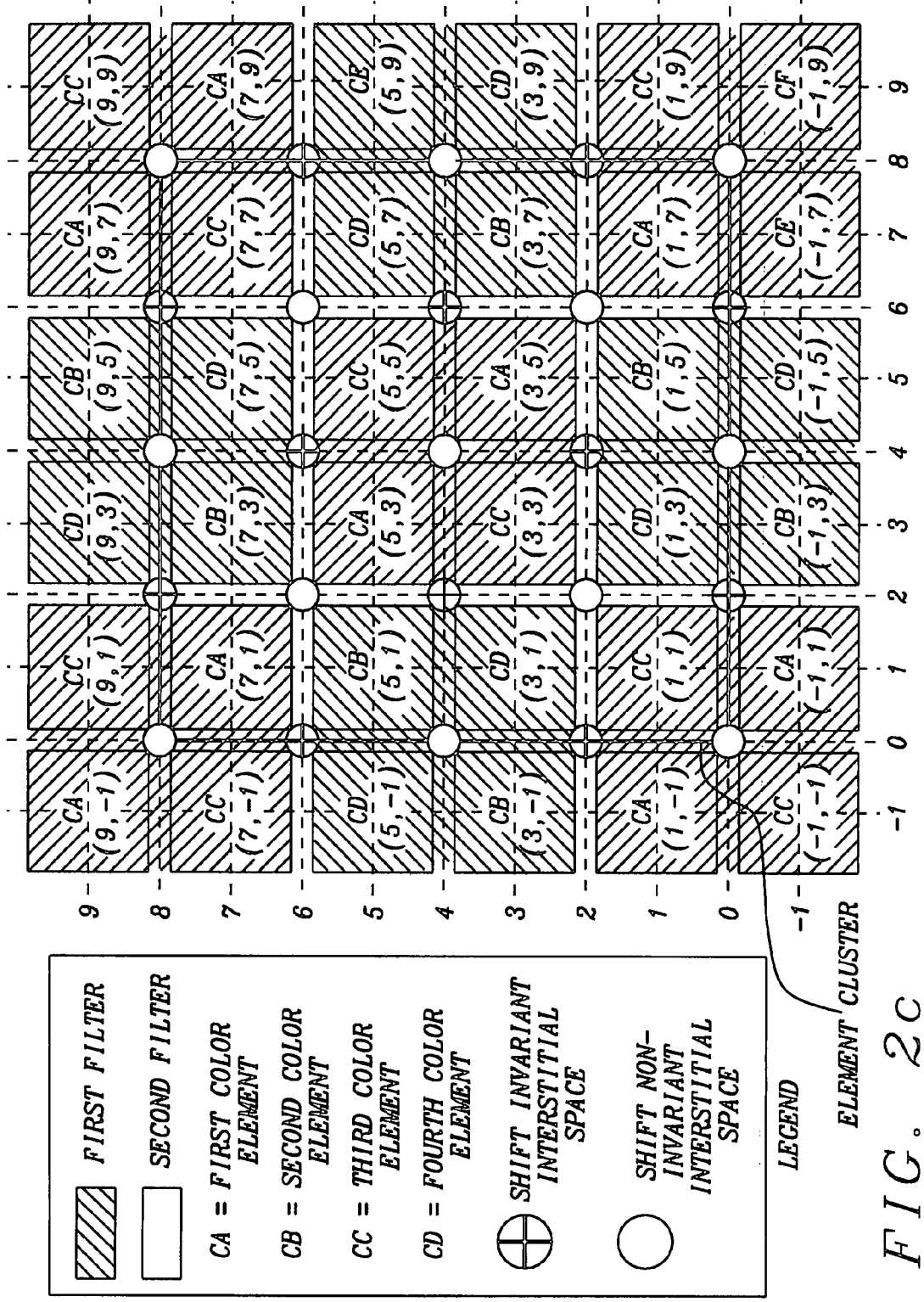
FIGS. 2c, 2d, an 2e are diagrams of an image array constructed of patterned array of four color elements illustrating the color element layout showing the shift invariant interstitial spaces and non-shift invariant interstitial spaces.

Referring to FIG. 2c, a mosaic structured color element array pattern is divided into a matrix where the color elements are designated with odd index numbers. The interstitial spaces between the color elements are designated with even index numbers. The color elements of the mosaic structured color element array pattern that are designated as CA, CB, CC, and CD as in FIGS. 2a and 2b. The interstitial space (2,2), for instance is a non-shift invariant point (O) and the average intensity of that point does not contain the appropriate information of the image. Alternately, interstitial space (4,2) can be shown to be shift invariant (⊕) and its average intensity is the average of the adjacent color elements and is determined according to the formula;

$$\overline{I(4, 2)} = \frac{I_{CD}(1, 3) + I_{CB}(1, 5) + I_{CC}(3, 3) + I_{CA}(3, 5)}{4}$$

where:
$l_{CD}(1,3)$ is the intensity data of the color element (CD) at location (1,3).
$l_{CB}(1,5)$ is the intensity data of the color element (CB) at location (1,5).
$l_{CC}(3,3)$ is the intensity data of the color element (CC) at location (3,3).
$l_{CA}(3,5)$ is the intensity data of the color element (CA) at location (3,5)

Figure 2D:
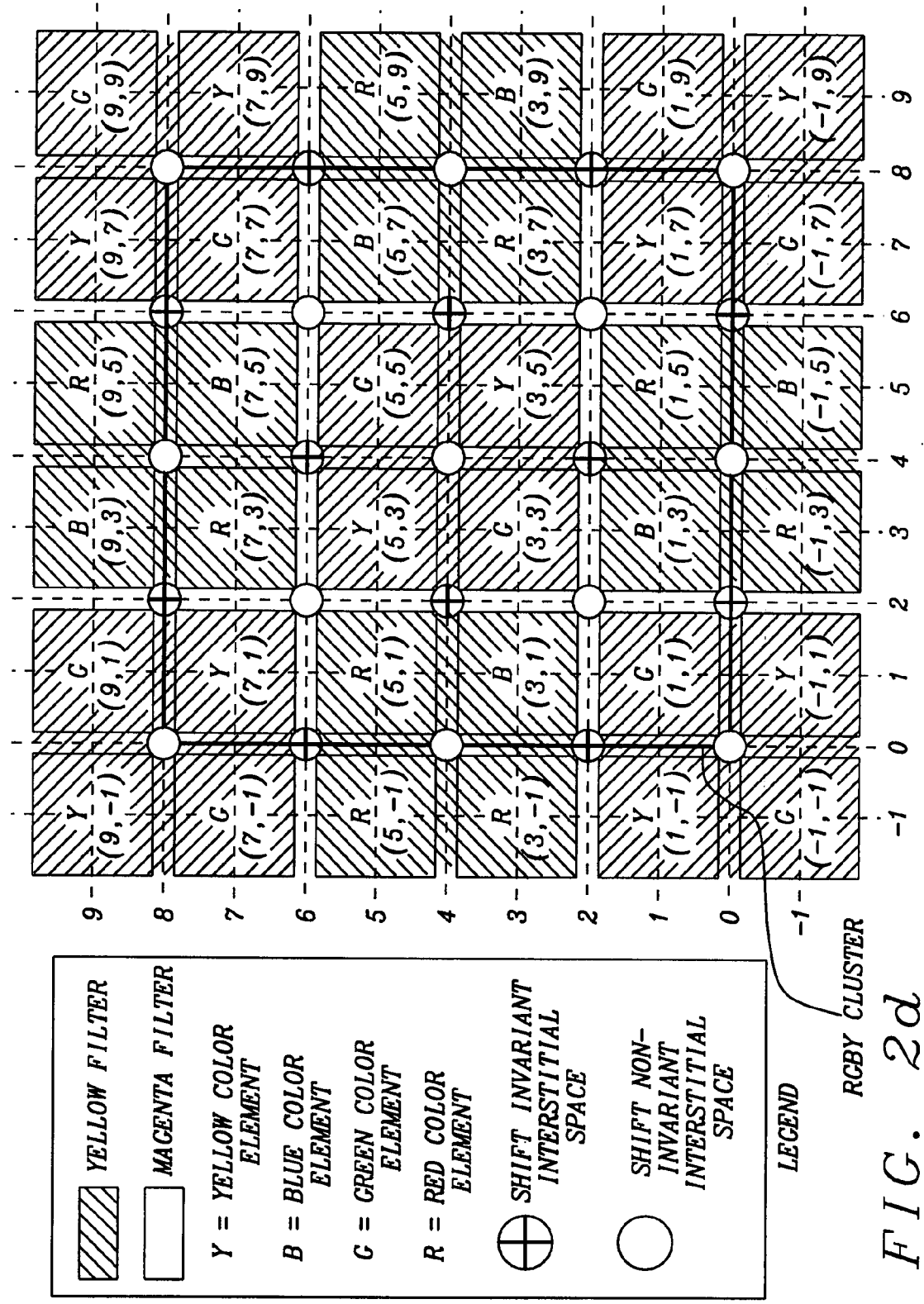
Figure 2E:
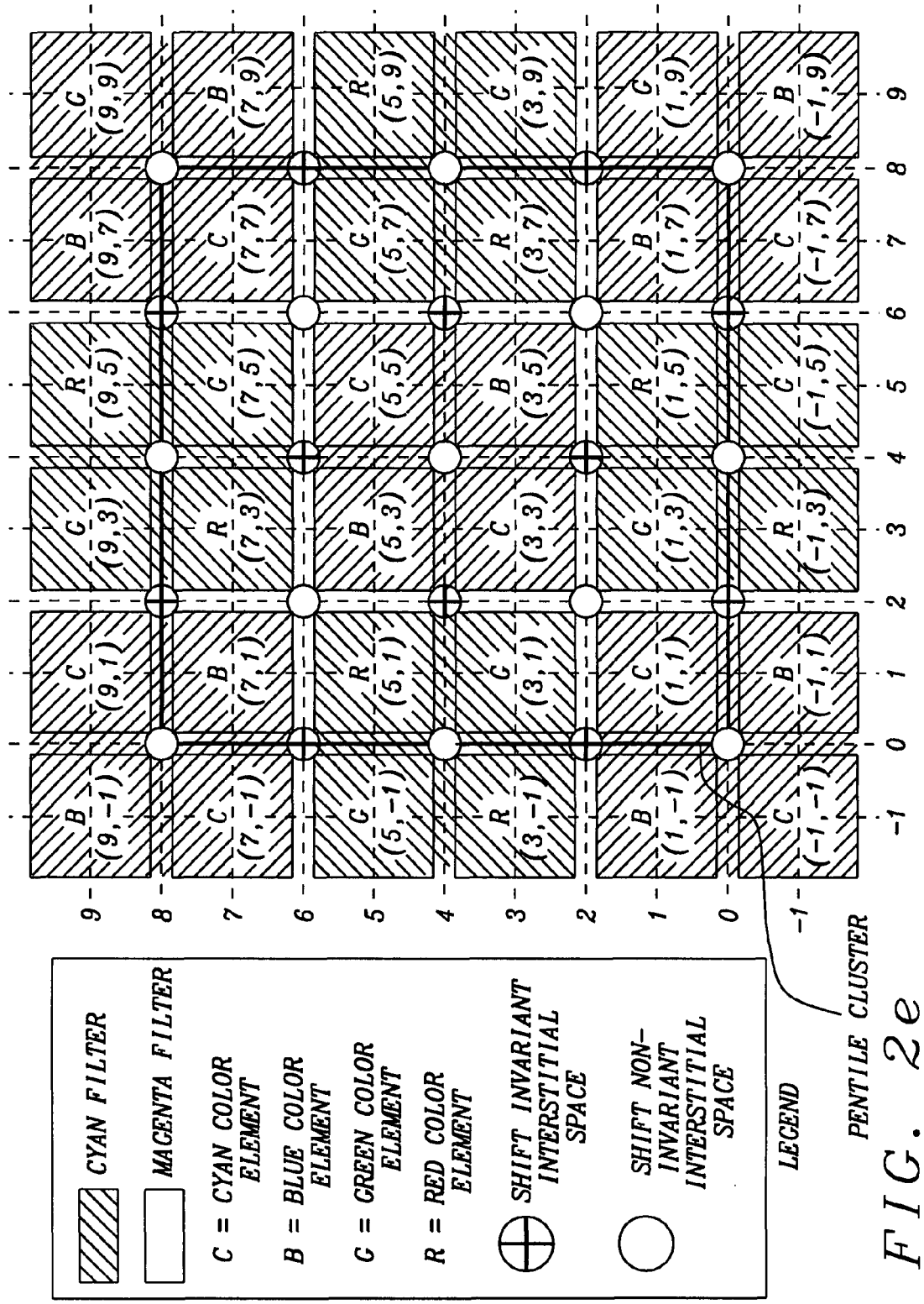

The mosaic structured color element array patterns of FIGS. 2d and 2e illustrate examples of mosaic structured color element array pattern that may be used to provide the structure of the Pentile matrix. In the mosaic structured color element array pattern of FIG. 2d, the color element CA is dominantly a Yellow (Y) color element, the color element CB is dominantly a Red (R) color element, the color element CC is dominantly a Green (G) color element, and the color element CD is dominantly a Blue (B) color element. In the mosaic structured color element array pattern of FIG. 2e, the color element CA is dominantly a Blue (B) color element, the color element CB is dominantly a Red (R) color element, the color element CC is dominantly a Cyan (C) color element, and the color element CD is dominantly a Green (G) color element.

Figure 3:
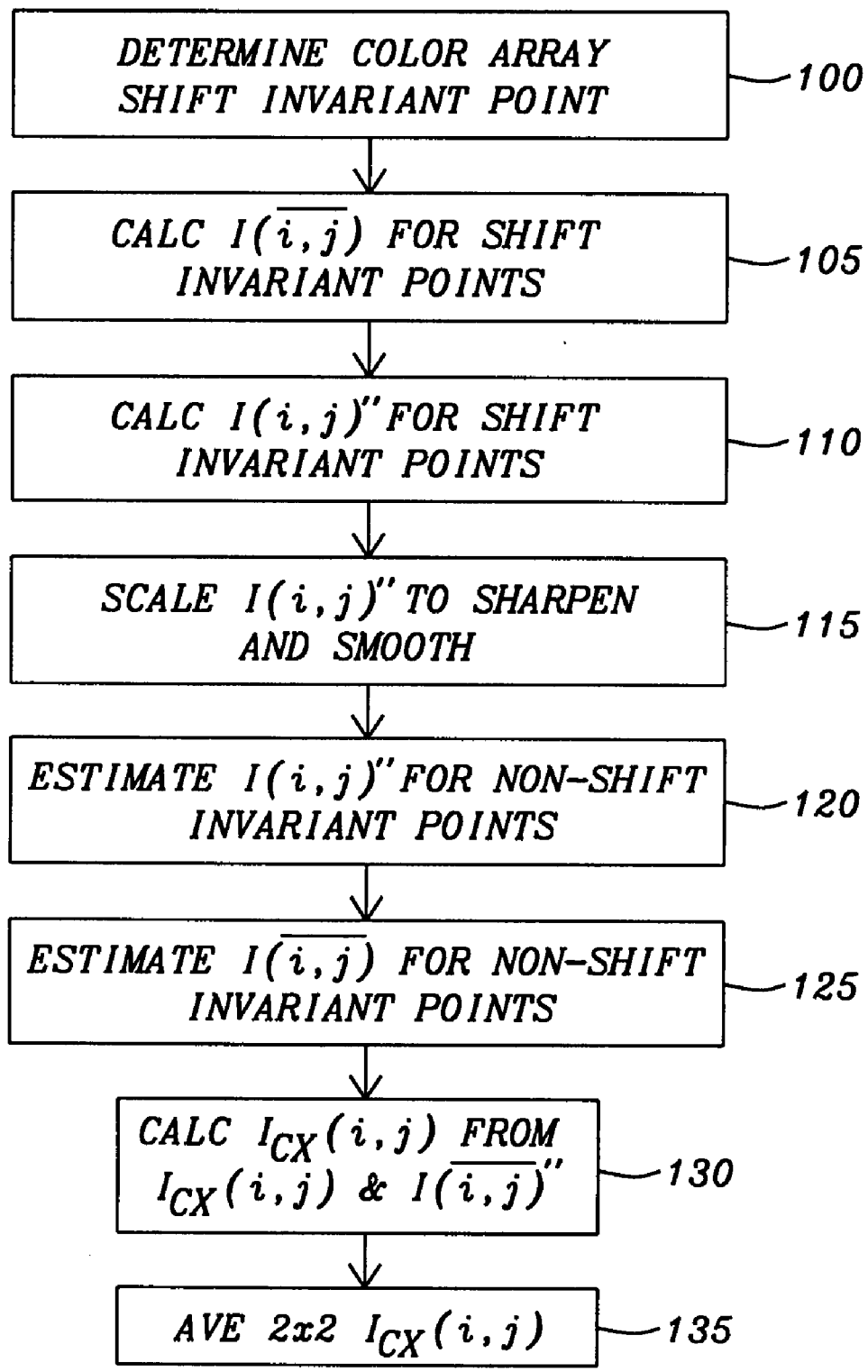
FIG. 3 is a flow chart of the method of this invention that interpolates image data.

Using the structure of the image array of FIG. 2c, refer now to FIG. 3 for a discussion of the Shift Invariant Differential (SID) Image Data Interpolation method of this invention for processing raw image data with a mosaic structured color element array pattern, such as the Pentile matrix pattern in a way that allows the calculation of the color values be independent of the location chosen at intervals of maximum sampling spatial frequency. The method begins by determining (Box 100) the locations of the shift invariant points within the mosaic structured color element array pattern. As noted above, the color elements of a mosaic structured color element array pattern are shift variant and the locations within the matrix that are shift invariant for the light intensity and the second order derivative of the intensity must be located. In the structure of FIG. 2c, the shift invariant locations are determined to be in the interstitial space at the junction of the four color elements CA, CB, CC, and CD of the mosaic structured color element array pattern. In the FIG. 2d, the color elements would be Yellow (Y), Red (R), Green (G), and Blue (B). Alternately, in the FIG. 2e, the color elements would be Blue (B), Red (R), Cyan (C), and Green (G).

The average of the light intensity of the adjacent four color elements CA, CB, CC, and CD of each shift invariant interstitial space of each cluster of the mosaic structured color element array pattern is calculated (Box 105) by the formula:

$$\overline{I(i,j)} = \frac{\sum_{x=-1}^{+1}\sum_{y=0}^{+1} I(i+x, j+y)}{4}$$

where:

$\overline{I(i,j)}$ is the average illumination value of the color elements within the cluster surrounding the selected shift invariant point (i,j).

l(i+x,j+y) is the illumination of the $x^{th}$ and $y^{th}$ color element within the cluster centered on the selected shift invariant point. (i,j).

As an example, for the array of FIG. 2d, the calculation of the shift invariant point (4,2) becomes:

$$\overline{I(4,2)} = \frac{I_B(1,3) + I_G(3,3) + I_R(1,5) + I_Y(3,5)}{4}$$

where:

$\overline{I(4,2)}$ is the intensity value at the selected shift invariant point (4,2) of the color elements within the cluster.

$l_B(1,3)$ is the illumination of a Blue color element (B) within the cluster surrounding the selected shift invariant point (4,2).

$l_G(3,3)$ is the illumination of a Green color element (G) within the cluster surrounding the selected shift invariant point (4,2).

$l_R(1,5)$ is the illumination of a Red color element (R) within the cluster surrounding the selected shift invariant point (4,2).

$l_Y(3,5)$ is the illumination of a Yellow color element (Y) within the cluster surrounding the selected shift invariant point (4,2).

As a second example, for the array of FIG. 2e, the calculation of the shift invariant point (4,2) becomes:

$$\overline{I(4,2)} = \frac{I_G(1,3) + I_C(3,3) + I_B(1,5) + I_R(3,5)}{4}$$

where:

$\overline{I(4,2)}$ is the intensity value at the selected shift invariant point (4,2) of the color elements within the cluster.

$l_G(1,3)$ is the illumination of a Green color element (G) within the cluster surrounding the selected shift invariant point (4,2).

$l_C(3,3)$ is the illumination of a Cyan color element (C) within the cluster surrounding the selected shift invariant point (4,2).

$l_R(1,5)$ is the illumination of a Red color element (R) within the cluster surrounding the selected shift invariant point (4,2).

$l_B(3,5)$ is the illumination of a Blue color element (B) within the cluster surrounding the selected shift invariant point (4,2).

The intensity for each of the selected shift invariant points for each cluster of the color elements for the array is calculated. However, it is required that there are extra rows and columns (−1,−1) that provide the additional data at the edge of the image so that the intensity calculation is for a complete cluster.

The second order differential between the average intensity for each selected shift invariant point of each cluster of color element within the array is calculated (Box 110). It can be shown that the second order derivative can be calculated as the sum of the differences of the intensity at the selected shift invariant point (i,j) and the diagonal selected shift invariant points (i−2,j−2) and (i+2,j+2) and diagonal selected shift invariant points (i−2,j+2) and (i+2,j−2) or:

$I_1(i,j)''= l(i-2,j-2)-l(i,j)+l(i+2,j+2)-l(i,j)=(l(i-2,j-2)+l(i+2,j+2))-2*l(i,j)$ and $I_2(i,j)''= l(i+2,j-2)-l(i,j)+l(i-2,j+2)-l(i,j)=(l(i+2,j-2)+l(i-2,j+2))-2*l(i,j)$ The average of the two diagonal second order derivatives is further written as:

$$\overline{I(i,j)''} = \frac{I_1(i,j)'' + I_2(i,j)''}{2} \qquad \text{Eq. 1}$$

$$= \frac{(I(i-2,j-2)+I(i+2,j+2)+I(i+2,j-2)+I(i-2,j+2))}{2} - 2*I(i,j)$$

By substituting in the intensity values (l(i+x,j+y)) for each of the color elements and simplifying the average of the two diagonal second order derivative is further written in simplified form as:

$$\overline{I(i,j)''} =$$
$$\frac{A+B+C}{8} - (I_{CC}(i+1,j-1)+I_{CA}(i+1,j+1)+I_{CD}(i-1,j-1)+I_{CB}(i-1,j+1))*\frac{3}{8}$$

Where:

$A = l_{CA}(i+3,j-3)+l_{CD}(i+3,j+3)+l_{CC}(i-3,j-3)+l_{CC}(i-3,j+3)$ $B = l_{CA}(i+3,j-1)+l_{CC}(i+3,j+1)+l_{CD}(i+1,j-3)+l_{CC}(i-1,j-3)$ $C = l_{CB}(i+1,j+3)+l_{CA}(i-1,j+3)+l_{CB}(i-3,j-1)+l_{CD}(i-3,j+1)$ $l_{CA}$ is the intensity of the first color of a four color filter mosaic array cluster.

$l_{CB}$ is the intensity of the second color of a four color filter mosaic array cluster.

$l_{CC}$ is the intensity of the third color of a four color filter mosaic array cluster.

$l_{CD}$ is the intensity of the fourth color of a four color filter mosaic array cluster.

The above calculation is the diagonal second order derivative and is valid since the interpolation is calculated along the diagonal. If the 4×4 array is approximated as a circle, the second derivative can also be written as $l(i,j)'' = 2*[(\text{Average Peripheral Pixels})-(\text{Average Center Cluster Pixels})]$.

The second derivative for each of the shift invariant points can be expressed according to the formula $$I(i, j)'' = \frac{\sum_{x=0}^{1}\sum_{y=0}^{1} I(i+(4x-2), j+(4y-2))}{2} - 2*(I(i,j))$$

Where:
l(i, j)" is the second order derivative shift invariant points (i,j),
l(i+(4x-2), j+(4y-2)) is the illumination of the color elements within the cluster surrounding the shift invariant points (i,j), and
x and y are counting variables to describe the locations of the color elements within the cluster surrounding the shift invariant points (i,j).

If the indices are adjusted to permit the selection of only the shift invariant points, the second order derivative for the shift invariant points is express as the following equations.

$$I(4n+2, 4m)'' = \frac{\begin{bmatrix} I(4n, 4m-2) + I(4n+4, 4m-2) + \\ I(4n, 4m+2) + I(4n+4, 4m+2) \end{bmatrix}}{2} - 2*I(4n+2, 4m)$$

$$I(4n, 4m+2)'' = \frac{\begin{bmatrix} I(4n-2, 4m) + I(4n+2, 4m) + \\ I(4n-2, 4m+4) + I(4n+2, 4m+4) \end{bmatrix}}{2} - 2*I(4n, 4m+2)$$

The above equations are equivalent to the Eq. 1 above with the indices are modified to emphasize the shift invariant interstitial space locations.

A smoothing or sharpening of the image is optionally accomplished by scaling (Box 115) the second order derivative by the formula:

$$I''_{ss} = \frac{I(i,j)''}{\text{Scale\_Sharp\_Smooth}}$$

where:
$l_{ss}''$ is the smoothed and sharpened second order derivative,
l(i,j)" is the second order derivative, and
Scale_Sharp_Smooth is the scaling factor.

Those interstitial spaces (i,j) between the four color elements CA, CB, CC, and CD of the mosaic structured color element array pattern (FIG. 2c) have all of the four color elements CA, CB, CC, and CD surrounding the interstitial space. This, as described above, defines the shift invariant points where the second order derivative is calculated. This is the fundamental feature of the interpolation algorithm. Since there are now locations where the interstitial spaces are not surrounded by all four of the color elements CA, CB, CC, and CD, these interstitial spaces are non-shift invariant. The second order derivative for the non-shift invariant locations is determined by a calculating the intensity values of the non-shift invariant interstitial spaces by performing a four way interpolation for each color element not included at the non-shift invariant interstitial spaces. The intensity values of the non-shift invariant interstitial spaces by first estimating (Box 120) the second order derivatives for the non-shift invariant interstitial spaces. The estimated second order derivatives are calculated by averaging the four adjacent second derivatives of the surrounding shift invariant interstitial spaces. This is done in X-Y direction of the mosaic structured color element array pattern. The estimated second order derivative of each non-shift invariant interstitial space is calculated by the equation:

$$I(n, m)'' = \frac{\begin{bmatrix} I(n-2, m)'' + I(n+2, m)'' + \\ I(n, m-2)'' + I(n, m+2)'' \end{bmatrix}}{4}$$

where:
l(n,m)" is the estimated second order differential for the non-shift invariant point (m,n),
l(n-2,m)"+l(n+2,m)"+l(n,m-2)"+l(n,m+2)" is the sum of the second order differentials of the surrounding shift invariant points.

The average illumination of each of the non-shift invariant interstitial spaces is then estimated (Box 125) based on the adjacent intensity functions and the newly estimated (Box 120) second order derivative l(n,m)" of the non-shift invariant interstitial spaces. The average illumination value is scaled by square root of two in order to adjust the change in step size from diagonal to X-Y direction of the shift invariant interstitial spaces. The estimated average illumination values of the non-invariant interstitial spaces is calculated according to the formula:

$$\overline{I(n,m)} = \frac{\frac{\overline{I(n-2,m)} + \overline{I(n+2,m)} + }{\overline{I(n,m-2)} + \overline{I(n,m+2)}}}{4} - \frac{I(n-2,m)''}{2}}{\sqrt{2}}$$

where:
$\overline{I(n,m)}$ is the average illumination value of said non-shift invariant points, and
$\overline{I(n-2,m)} + \overline{I(n+2,m)} + \overline{I(n,m-2)} + \overline{I(n,m+2)}$ is the average of the illumination of said shift invariant points surrounding said non-shift invariant point (n,m).

The intensity of each color for each interstitial space (i,j) is calculated (Box 130) as function of the raw intensity data $l_c(i,j,c)$ for each color c of each color element of the cluster and the second order derivative for the shift invariant interstitial spaces and the estimated second order derivative for the non-shift invariant interstitial spaces. The intensity for each color for each interstitial space is calculated according to the formula:

$$l_c(i,j,x) = l_{cx}(i-k, j-l) + l(i,j)/2 - l(i-2*l, j-2*l)/2 - l(i,j)''/8$$

where:
x is the designation of the color element type.
k and l are +/−1 depending on color element type.
For the array of FIG. 2c the calculation becomes:

$$l(4,6,CA) = l_{CA}(5,3) + l(4,6)/2 - l(4,2)/2 - l(4,6)''/8$$

$$l(4,6,CB) = l_{CB}(7,3) + l(4,6)/2 - l(2,8)/2 - l(4,6)''/8$$

$$l(4,6,CC) = l_{CC}(5,5) + l(4,6)/2 - l(6,4)/2 - l(4,6)''/8$$

$$l(4,6,CD) = l_{CD}(7,5) + l(4,6)/2 - l(6,8)/2 - l(4,6)''/8$$

If there are missing color elements within the cluster, the shift invariant points in between are equally spaced from neighboring shift invariant points. The missing colors are calculated by standard interpolation algorithms. This would involve the nearest neighbor color elements. Higher order correction is employed depending on the memory availability. The simplest estimation of the missing color elements is based on the average of all nearest neighbors.

The step size taken during the calculation to interpolate the color data results in the color data information at an increased resolution due to the second order derivative obtained in the center and applied to the adjacent color element. This manifests itself as a sharpening of the image. To restore the image to its normal resolution and correct systematic color errors, the intensity value for each color element is calculated (Box 135) as the average of each of the color intensity values $1_{CA}$(i, j), $1_{CB}$(i, j), $1_{CC}$(i, j), and $1_{CD}$(i, j), at the four corners of each color element. The calculated color data points for each non-shift invariant interstitial space may be averaged (Box 135) by the formula $$\overline{I_c(x, y)} = \left. \frac{\sum_{x=0}^{1} \sum_{y=0}^{1} I_c(i - 2^*x - 1, j - 2^*y - 1)}{4} \right| C = CA, CB, CC, CD$$

where:

$\overline{I_c(i,j)}$ is the average color data, and $l_c$(x, y) is the calculated color data for each junction of one color element (C), x and y are counting variables for the respectively dimensions i, and j of the plurality of color elements.

It should be noted that the sharpened version of the calculated color data (Box 130) of the interpolated image prior to the averaging (Box 135) would be useful in creating a printed version of the image. It is well known that printers especially an inexpensive printer) have diffusion effects of their inks on paper. The interpolated color data provides a sharpened image to provide some compensation to this diffusion effect.

Figure 4:
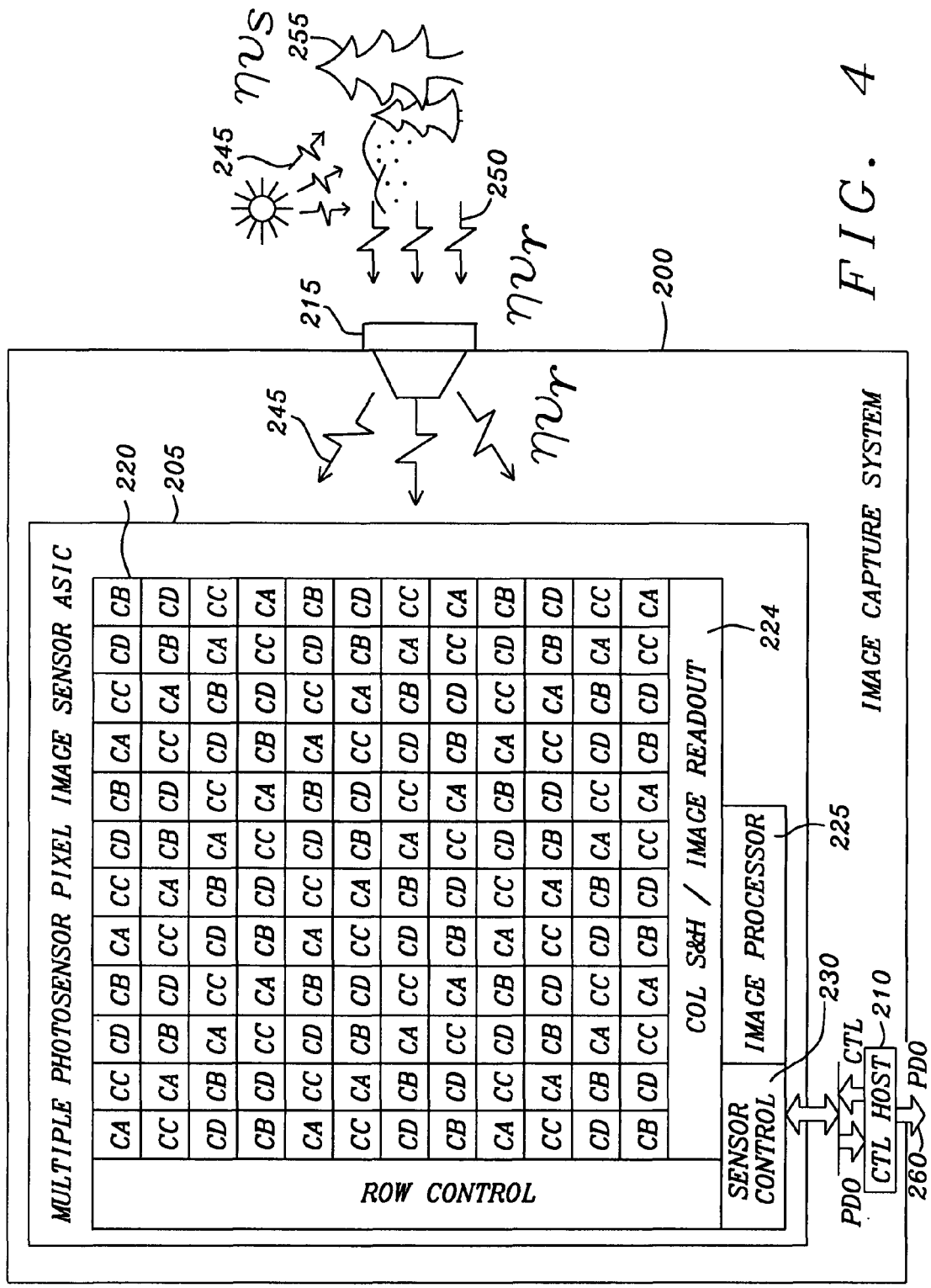
FIG. 4 is a diagram of an imaging system of this invention that incorporates an image processor that interpolates image data.

Refer now to FIG. 4 for a discussion of a system that incorporates an image processor that performs an interpolation process on raw image data employing a mosaic structure such as the Pentile Matrix to prevent uniform illumination interference and color shifting from various edges and shapes within the image. The image capture system 200 includes the image processing application specific integrated circuit 205, control host 210, and a focusing lens 215. The image processing application specific integrated circuit 205 contains a multiple photosensor color element image sensor array 220 and on-chip image processing 210. The image processing application specific integrated circuit 205 also contains sensor I/O control 230 with an interface with the control host 210. The focusing lens 215 allows passage of reflected light 245 to enter the image capture system 200 and impinge upon the array of multiple photosensor color element image sensors 220. Ambient lighting 250 is reflected from a scene 255 as the reflected light 245.

The array of multiple photosensor color element image sensor 220 converts the photons of the reflected light 245 to photoelectrons. The image readout 224 generates digital data signals from the photoelectron. The digital data signals are further manipulated by the image processor 225 and transferred from the control host 210. The control host then processes the color element data output 260 for eventual display. The image capture system 200 produces image data 260 that is organized to be equivalent to a video display such as the data structure described above for the Pentile pattern.

Figure 5:
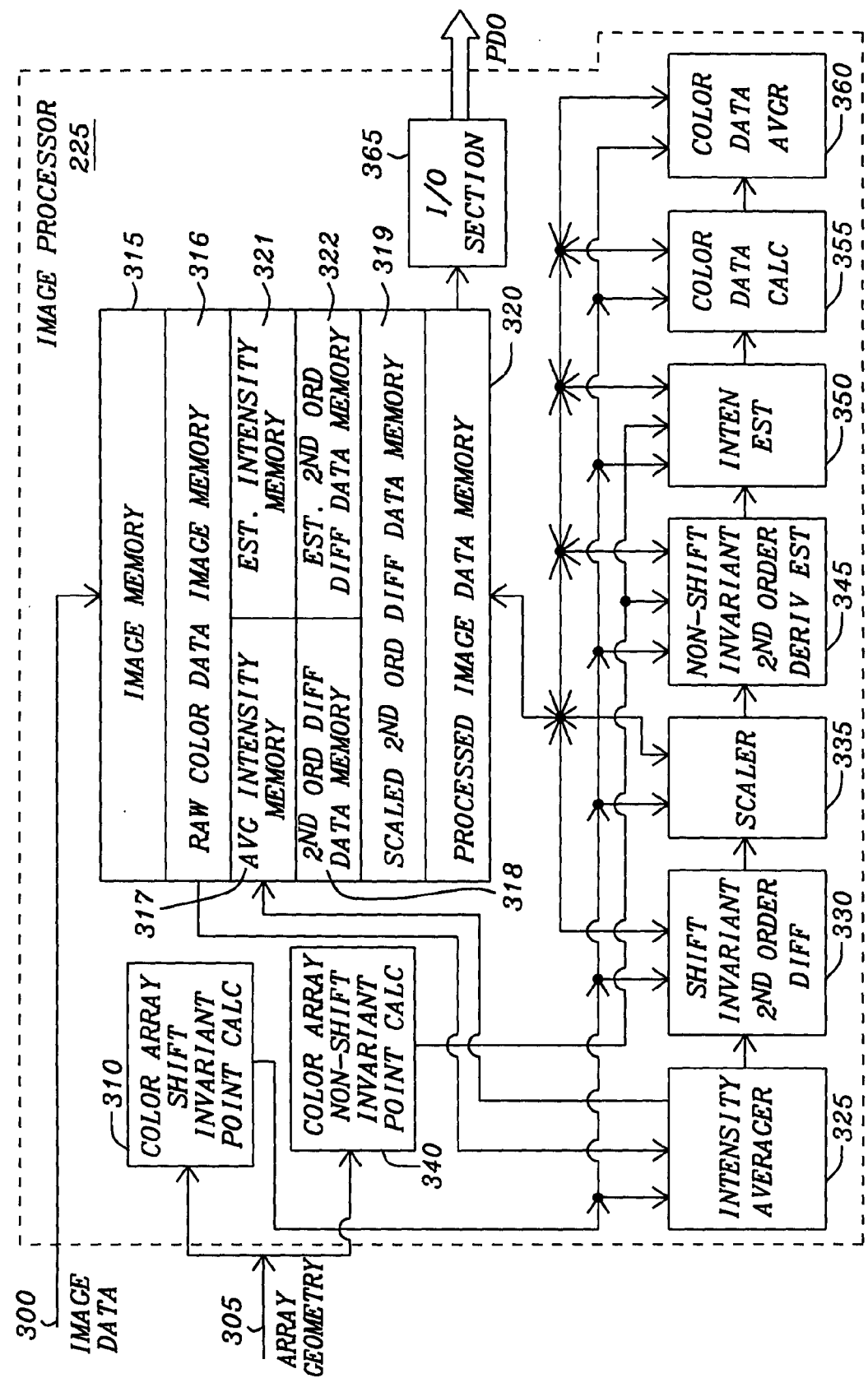
FIG. 5 is a block diagram of a first embodiment of an image processor of this invention that interpolates image data.

Refer now to FIG. 5 for a discussion of the structure and operation of the image processor 225 of this invention that performs an interpolation process on raw image data of a multiple photosensor color element image sensor array 220 of FIG. 4 in a way that allows the calculation of the color values to be independent of the location chosen at intervals of maximum sampling spatial frequency. The image processor has a color array shift invariant point calculator 310 which receives an array geometry descriptor 305. From the array geometry descriptor 305, the color array shift invariant point calculator 310 determines the shift invariant points within the mosaic structured color element array pattern according to the procedure (Box 100) of FIG. 3. As noted above, the color elements of a mosaic structured color element array pattern and the interstitial spaces, where all the color elements CA, . . . , CD are not adjoining, are shift variant. The locations of the interstitial spaces within the matrix that are shift invariant for the light intensity and the second order derivative of the intensity must be located. In the structure of FIG. 2c, the shift invariant locations (⊕) are determined to be in the interstitial space at the junction of the four color elements CA, . . . , CD of the mosaic structured color element array pattern.

The raw image data 300 is retained in the Raw Color Data Image Memory 316 of the image memory 315. The intensity averager 325 receives the shift invariant coordinates from the color array shift invariant point calculator 310 and extracts the raw color data from the raw color data image memory 316. The intensity averager 325 determines the average intensity according to the procedure (Box 105) of the method of FIG. 3. The average intensity of each of the shift invariant locations within the mosaic structured color element array pattern is retained in the average intensity memory 317. The second order differentiator 330 receives the average intensity and determines the second order differential between the average intensity for each interstitial space of each cluster of color element within the array according to the procedure (Box 110) of FIG. 3. As noted above, it can be shown that the second order derivative can be calculated as the sum of the differences of the intensity at the interstitial space (i,j) and the diagonal interstitial spaces (i−2,j−2) and (i+2,j+2) and diagonal interstitial spaces (i−2,j+2) and (i+2,j−2). The second order differentiated image data is retained within the second order differentiated data memory 318.

The second order differentiated image data is transferred to the scaler circuit 335. The scaler optionally performs a smoothing or sharpening of the second order differentiated image data by the procedure (Box 115) of the method of FIG. 3. The scaled second order differentiated image data is retained, by the scaled second order differentiated image data memory 319.

Either the second order differentiated image data or the optionally scaled second order differentiated image data is transferred to the non-shift invariant interstitial space second order derivative estimator 345. The color array non-shift invariant interstitial point calculator 340 determines the non-shift invariant interstitial space locations (O of FIG. 2c) according to the procedure (Box 120) of the method of FIG. 3. From the locations of the non-shift invariant interstitial spaces of the mosaic structured color element array pattern and the second order differentiated image data or the optionally scaled second order differentiated image data of the shift invariant interstitial spaces surrounding the non-shift invariant spaces, the non-shift invariant interstitial space second order derivative estimator 345 estimates the second order derivative for each the non-shift invariant interstitial spaces of the mosaic structured color element array pattern according to the procedure (Box 120) of the method of FIG. 3. The non-shift invariant interstitial space second order derivative estimator 345 transfers the estimated second order derivative data for the non-shift invariant interstitial space to the estimated second order derivative memory 322.

The intensity estimator 350 receives the average intensities of the shift invariant interstitial spaces from the average intensity memory 317 and the estimated second order derivative data from the estimated second order derivative memory 322.

The intensity estimator 350 then estimates the intensity of each of the non-shift invariant interstitial locations to generate the estimated intensity data according to the procedure (Box 125) of the method of FIG. 3. The estimated intensity data is transferred for retention by the estimated intensity memory 321 in the image memory 315.

The average intensity data, the estimated intensity data, the second order derivative data for the shift invariant interstitial locations, the estimated second order derivative data for the non-shift invariant interstitial locations and the raw image data is transferred to the color data averager 355. As described above, the step size taken during the calculation to interpolate the color data results in the color data information at an increased resolution due to the second order derivative obtained in the center and applied to the adjacent color element. This manifests itself as a sharpening of the image. To restore the image to its normal resolution, the color data averager calculates the intensity value for each color element by the procedure (Box 130) of the method of FIG. 3 as the average of each of the color intensity values $1_{CA}(i,j)$, $1_{CB}(i,j)$, $1_{CC}(i,j)$, and $1_{CD}(i,j)$ at the four corners of each color element.

To restore the image to its normal resolution and correct systematic color errors, the intensity value for each color element of the mosaic structured color element array pattern is calculated by the color data averager 360 as the average of each of the color intensity values $1_{CA}(i, j)$, $1_{CB}(i, j)$, $1_{CC}(i, j)$, and $1_{CD}(i, j)$ at the four corners of each color element according to the procedure (Box 135) of the method of FIG. 3. The calculated color data for each color element is transferred to the processed image data memory 320.

The processed image data and the calculated color data is retained by the process image data memory 320 and at the completion of the shift invariant interpolation of the image data, the processed image data and the calculated color data is transferred from the image data memory 315 to the input/output section 365 for conditioning and buffering. The processed image data is then transferred as the color element data output PDO to the control host 210 of FIG. 5.

Figure 6:
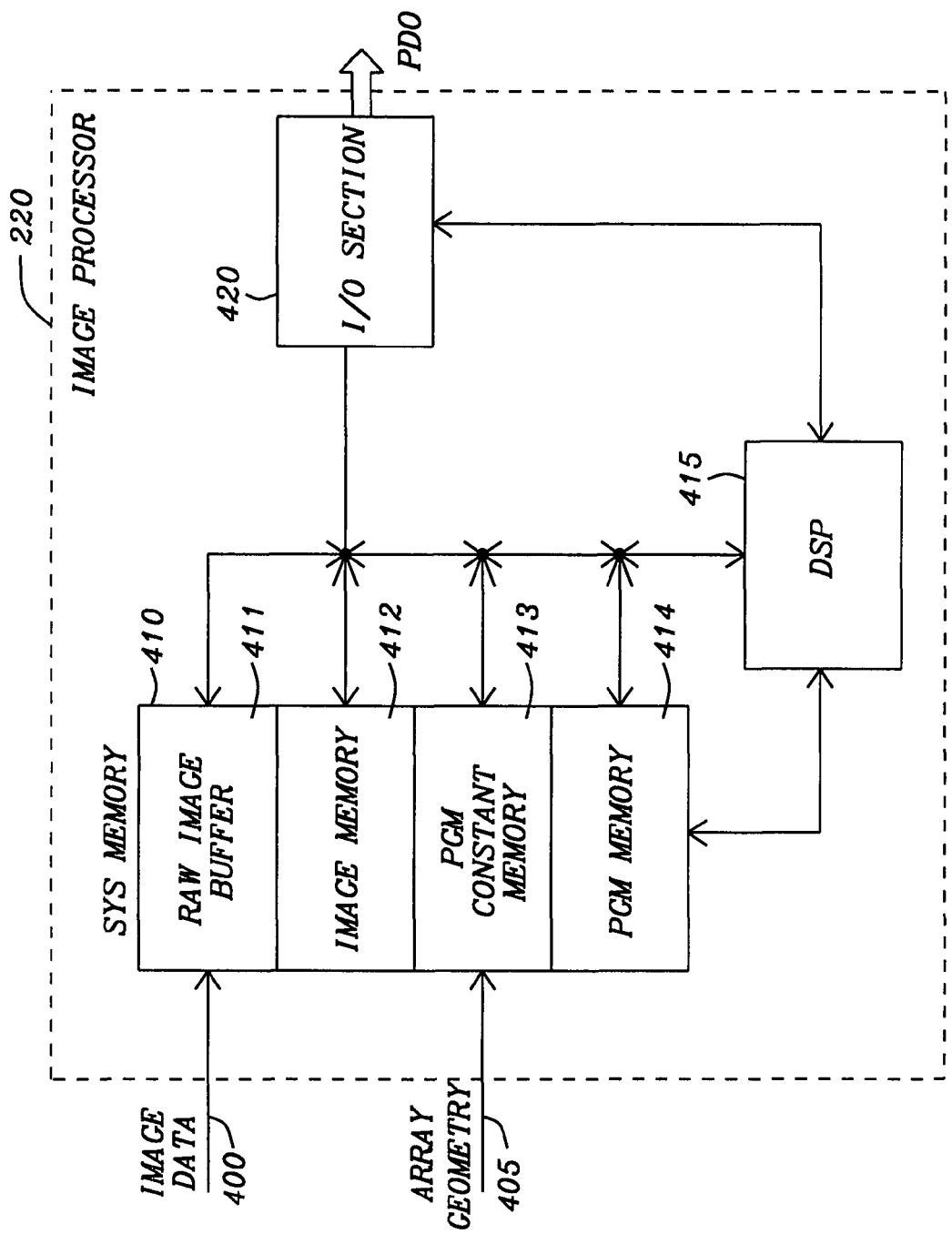
FIG. 6 is a block diagram of a second embodiment of an image processor of this invention that interpolates image data.

A second embodiment of the image processor 225 of this invention that performs an interpolation process on raw image data of a mosaic structured color element array pattern 220 of FIG. 4 for processing raw image data in a way that allows the calculation of the color values to be independent of the location chosen at intervals of maximum sampling spatial frequency is shown in FIG. 6. The image processor includes a system memory 410 that acts as a medium for retaining a computer program code in a program memory 414. The system memory 410 may be any data retention medium such as a Dynamic or Static random access memory, an electro-optical disk, a magnetic disk, a non-volatile random access memory.

The program code is retrieved and executed by a computing system such as the digital signal processor (DSP) 415. The DSP 415 performs a computer program process for processing raw image data for interpolating the raw image data of the mosaic structured sensor. The interpolation of the image data of the mosaic structured color element array pattern allows the calculation of the color values to be independent of the location chosen at intervals of maximum sampling spatial frequency. The program code as retained in the program memory 414 when executed performs the program process that executes the method as described in FIG. 3.

The array geometry descriptor 405 is retained by the program constant memory section 413 of the system memory 410. From the array geometry descriptor 405, the DSP 415 determines the shift invariant points within the mosaic structured color element array pattern according to the procedure (Box 100) of FIG. 3. As noted above, the color elements of a mosaic structured color element array pattern and the interstitial spaces, where all the color elements CA, . . . , CD are not adjoining, are shift variant. The locations of the interstitial spaces within the matrix that are shift invariant for the light intensity and the second order derivative of the intensity must be located. In the structure of FIG. 2c, the shift invariant locations (⊕) are determined to be in the interstitial space at the junction of the four color elements CA, . . . , CD of the mosaic structured color element array pattern. The coordinates of the shift invariant points of the mosaic structured color element array pattern are retained in the program constant memory section 413 of the system memory 410

The raw image data 400 is transferred from the mosaic structured sensor 220 of FIG. 5 to the raw image buffer 411 of the system memory 410. The DSP 415 receives the shift invariant coordinates from the program constant memory section 413 and extracts the raw color data from the raw data buffer 411. The DSP 415 determines the average intensity according to the procedure (Box 105) of the method of FIG. 3. The average intensity of each of the shift invariant locations within the mosaic structured color element array pattern is retained in the image data memory 412. The DSP 415 then extracts the average intensity and determines the second order differential between the average intensity for each interstitial space of each cluster of color elements within the array according to the procedure (Box 110) of FIG. 3. As noted above, it can be shown that the second order derivative can be calculated as the sum of the differences of the intensity at the interstitial space (i,j) and the diagonal interstitial spaces (i−2, j−2) and (i+2,j+2) and diagonal interstitial spaces (i−2,j+2) and (i+2,j−2). The second order differentiated image data is retained within the image data memory 412.

The second order differentiated image data is extracted from the image data memory 412 by the DSP 415. The DSP 415 optionally performs a smoothing or sharpening of the second order differentiated image data by the procedure (Box 115) of the method of FIG. 3. The scaled second order differentiated image data is then retained by the image data memory 412.

Either the second order differentiated image data or the optionally scaled second order differentiated image data is extracted from the image data memory 412 by the DSP 415. The DSP 415 determines the non-shift invariant interstitial space locations (O of FIG. 2c) according to the procedure (Box 120) of the method of FIG. 3. From the locations of the non-shift invariant interstitial spaces of the mosaic structured color element array pattern and the second order differentiated image data or the optionally scaled second order differentiated image data of the shift invariant interstitial spaces surrounding the non-shift invariant spaces, the DSP 415 estimates the second order derivative for each the non-shift invariant interstitial spaces of the mosaic structured color element array pattern according to the procedure (Box 120) of the method of FIG. 3. The DSP 415 transfers the estimated second order derivative data for the non-shift invariant interstitial space to the image data memory 412.

The DSP 415 retrieves the average intensities of the shift invariant interstitial spaces and the estimated second order derivative data from the image data memory 412. The DSP 415 then estimates the intensity of each of the non-shift invariant interstitial locations to generate the estimated intensity data by the procedure (Box 125) of the method of FIG. 3. The estimated intensity data is then transferred for retention by the DSP 415 to the image data memory 412.

As described above, the step size taken during the calculation to interpolate the color data results in the color data information at an increased resolution due to the second order derivative obtained in the center and applied to the adjacent color element. This manifests itself as a sharpening of the image. To restore the image to its normal resolution, the DSP 415 calculates the intensity value for each color element by the procedure (Box 130) of the method of FIG. 3 as the average of each of the color intensity values $l_{CA}(i,j)$, $l_{CB}(i,j)$, $l_{CC}(i,j)$, and $l_{CD}(i,j)$ at the four corners of each color element. The processed image data is again retained by the image data memory 412 and at the completion of the shift invariant interpolation of the image data, the processed image data is transferred from the image data memory 412 to the input/output section 420 for conditioning and buffering. The processed image data is then transferred as the color element data output PDO to the control host 210 of FIG. 5.

In summary, the Shift Invariant Differential (SID) Image Data Interpolation method and the image processor that provides the mechanisms necessary for performing the Shift Invariant Differential (SID) Image Data Interpolation first determines the shift invariant locations for the mosaic structured color element array pattern. The shift invariant average intensity function and its second derivative at the corresponding locations of the mosaic structured color element array pattern are calculated.

The nearest neighbor second order derivative is used to estimate the second derivative in non-shift invariant locations of the mosaic structured color element array pattern. This will be the average of the second order derivative of the shift invariant nearest neighbors surrounding the non-shift invariant locations of the mosaic structured color element array pattern. The newly calculated second order derivative and the surrounding shift invariant average intensities are used to calculate the intensity at the non-shift invariant locations of the mosaic structured color element array pattern. The color values are then interpolated using the average intensity values and the second order derivatives of the interstitial spaces of the mosaic structured color element array pattern. Optionally, the interpolated values for all four corners of the color elements are used to calculate the interpolated values for each color element by averaging each color element by averaging the intensity values of the four corners. This corrects for the systematic errors introduced by the SID interpolation.

While this invention has been particularly shown and described with reference to the preferred embodiments thereof, it will be understood by those skilled in the art that various changes in form and details may be made without departing from the spirit and scope of the invention.

The invention claimed is:

1. A system comprising:
   an array of color sensors including shift invariant points and non-shift invariant points at interstitial spaces between the color sensors; and
   a processing device configured to determine illumination values associated with the shift invariant points based on image data from the color sensors that surround the shift invariant points, to estimate illumination values associated with the non-shift invariant points based, at least in part, on the illumination values associated with the shift invariant points that surround the non-shift invariant points, and to determine color data for color sensors corresponding to each interstitial space based, at least in part, on the illumination values associated with the shift invariant points and the non-shift invariant points.

2. The system of claim 1, wherein the processing device is configured to determine the locations of shift invariant points and non-shift invariant points in the array of color sensors from geometric data corresponding to a configuration of the array of color sensors.

3. The system of claim 1, wherein the processing device is configured to average the image data from the color sensors that surround corresponding shift invariant points to determine the illumination values associated with the shift invariant points.

4. The system of claim 1, wherein the processing device is configured to determine second order derivatives of the illumination values corresponding to the shift invariant points, and to determine the color data corresponding to the shift invariant points based, at least in part, on the second order derivatives of the illumination values corresponding to the shift invariant points.

5. The system of claim 4, wherein the processing device is configured to average the illumination values that surround each shift invariant point to determine the second order derivatives of the illumination values corresponding to the shift invariant points.

6. The system of claim 4, wherein the processing device is configured to selectively smooth or sharpen the second order derivatives of the illumination values corresponding to the shift invariant points based on a scaling factor.

7. The system of claim 4, wherein the processing device is configured to estimate second order derivatives of the illumination values corresponding to the non-shift invariant points based, at least in part, on the second order derivatives corresponding to the shift invariant points.

8. The system of claim 7, wherein the processing device is configured to average the second order derivatives of the illumination values corresponding to the shift invariant points that surround each shift non-invariant point to estimate the second order derivatives of the illumination values corresponding to the non-shift invariant points.

9. The system of claim 7, wherein the processing device is configured to estimate the illumination values associated with the non-shift invariant points based, at least in part, on the illumination values associated with the shift invariant points that surround the non-shift invariant points and the estimated second order derivatives of the illumination values corresponding to the non-shift invariant points.

10. The system of claim 1, wherein the processing device is configured to determine the color data corresponding to non-shift invariant points based, at least in part, on the second order derivatives of the illumination values corresponding to the non-shift invariant points.

11. A method comprising:
    determining, by an imaging device, illumination values associated with shift invariant points at interstitial spaces of an array of color sensors based on image data from color sensors that surround the shift invariant points;
    estimating, by the imaging device, illumination values associated with non-shift invariant points at interstitial spaces of the array of color sensors based, at least in part, on the illumination values associated with the shift invariant points that surround the non-shift invariant points; and
    determining, by the imaging device, color data for color sensors corresponding to each interstitial space based, at least in part, on the illumination values associated with the shift invariant points and the non-shift invariant points.

12. The method of claim 11, further comprising:
    determining, by the imaging device, the locations of shift invariant points and non-shift invariant points in the array of color sensors from geometric data corresponding to a configuration of the array of color sensors.

13. The method of claim 11, wherein determining the illumination values associated with the shift invariant points further comprises averaging, by the imaging device, the image data from the color sensors that surround corresponding shift invariant points.

14. The method of claim 11, further comprising:
determining, by the imaging device, second order derivatives of the illumination values corresponding to the shift invariant points; and
determining, by the imaging device, the color data corresponding to the shift invariant points based, at least in part, on the second order derivatives of the illumination values corresponding to the shift invariant points.

15. The method of claim 14, wherein determining the second order derivatives of the illumination values corresponding to the shift invariant points further comprises averaging, by the imaging device, the illumination values that surround each shift invariant point.

16. The method of claim 14, further comprising selectively smoothing or sharpening, by the imaging device, the second order derivatives of the illumination values corresponding to the shift invariant points based on a scaling factor.

17. The method of claim 14, further comprising estimating, by the imaging device, second order derivatives of the illumination values corresponding to the non-shift invariant points based, at least in part, on the second order derivatives corresponding to the shift invariant points.

18. The method of claim 17, wherein estimating the second order derivatives of the illumination values corresponding to the non-shift invariant points further comprises averaging, by the imaging device, the second order derivatives of the illumination values corresponding to the shift invariant points that surround each shift non-invariant point.

19. The method of claim 17, wherein estimating the illumination values associated with the non-shift invariant points is based, at least in part, on the illumination values associated with the shift invariant points that surround the non-shift invariant points and the estimated second order derivatives of the illumination values corresponding to the non-shift invariant points.

20. The method of claim 11, wherein determining the color data corresponding to non-shift invariant points is based, at least in part, on the second order derivatives of the illumination values corresponding to the non-shift invariant points.

21. An apparatus comprising a computer-readable memory device storing instructions configured to cause a processing device to perform operations comprising:
determining illumination values associated with shift invariant points at interstitial spaces of an array of color sensors based on image data from color sensors that surround the shift invariant points;
estimating illumination values associated with non-shift invariant points at interstitial spaces of the array of color sensors based, at least in part, on the illumination values associated with the shift invariant points that surround the non-shift invariant points; and
determining color data for color sensors corresponding to each interstitial space based, at least in part, on the illumination values associated with the shift invariant points and the non-shift invariant points.

22. The apparatus of claim 21, wherein the instructions are configured to cause the processing device to perform operations further comprising determining the locations of shift invariant points and non-shift invariant points in the array of color sensors from geometric data corresponding to a configuration of the array of color sensors.

23. The apparatus of claim 21, wherein the instructions are configured to cause the processing device to perform operations further comprising averaging the image data from the color sensors that surround corresponding shift invariant points.

24. The apparatus of claim 21, wherein the instructions are configured to cause the processing device to perform operations further comprising:
determining second order derivatives of the illumination values corresponding to the shift invariant points; and
determining the color data corresponding to the shift invariant points based, at least in part, on the second order derivatives of the illumination values corresponding to the shift invariant points.

25. The apparatus of claim 24, wherein the instructions are configured to cause the processing device to perform operations further comprising averaging the illumination values that surround each shift invariant point.

26. The apparatus of claim 24, wherein the instructions are configured to cause the processing device to perform operations further comprising selectively smoothing or sharpening the second order derivatives of the illumination values corresponding to the shift invariant points based on a scaling factor.

27. The apparatus of claim 24, wherein the instructions are configured to cause the processing device to perform operations further comprising estimating second order derivatives of the illumination values corresponding to the non-shift invariant points based, at least in part, on the second order derivatives corresponding to the shift invariant points.

28. The apparatus of claim 27, wherein the instructions are configured to cause the processing device to perform operations further comprising averaging the second order derivatives of the illumination values corresponding to the shift invariant points that surround each shift non-invariant point.

29. The apparatus of claim 27, wherein the instructions are configured to cause the processing device to perform operations further comprising estimating the illumination values associated with the non-shift invariant points based, at least in part, on the illumination values associated with the shift invariant points that surround the non-shift invariant points and the estimated second order derivatives of the illumination values corresponding to the non-shift invariant points.

30. The apparatus of claim 21, wherein the instructions are configured to cause the processing device to perform operations further comprising determining the color data corresponding to non-shift invariant points based, at least in part, on the second order derivatives of the illumination values corresponding to the non-shift invariant points.

31. A system comprising:
means for determining illumination values associated with shift invariant points at interstitial spaces of an array of color sensors based on image data from color sensors that surround the shift invariant points;
means for estimating illumination values associated with non-shift invariant points at interstitial spaces of the array of color sensors based, at least in part, on the illumination values associated with the shift invariant points that surround the non-shift invariant points; and
means for determining color data for color sensors corresponding to each interstitial space based, at least in part, on the illumination values associated with the shift invariant points and the non-shift invariant points.

32. The system of claim 31, further comprising means for determining the locations of shift invariant points and non-shift invariant points in the array of color sensors from geometric data corresponding to a configuration of the array of color sensors.

33. The system of claim 31, wherein the means for determining the illumination values associated with the shift invariant points is further configured to average the image data from the color sensors that surround corresponding shift invariant points.

34. The system of claim 31, further comprising means for determining second order derivatives of the illumination values corresponding to the shift invariant points, wherein the means for determining color data is configured to determine the color data corresponding to the shift invariant points based, at least in part, on the second order derivatives of the illumination values corresponding to the shift invariant points.

35. The system of claim 34, wherein the means for determining the second order derivatives of the illumination values corresponding to the shift invariant points is configured to average the illumination values that surround each shift invariant point.

36. The system of claim 34, further comprising means for selectively smoothing or sharpening the second order derivatives of the illumination values corresponding to the shift invariant points based on a scaling factor.

37. The system of claim 34, further comprising means for estimating second order derivatives of the illumination values corresponding to the non-shift invariant points based, at least in part, on the second order derivatives corresponding to the shift invariant points.

38. The system of claim 37, wherein the means for estimating the second order derivatives of the illumination values corresponding to the non-shift invariant points is further configured to average the second order derivatives of the illumination values corresponding to the shift invariant points that surround each shift non-invariant point.

39. The system of claim 37, wherein the means for estimating the illumination values associated with the non-shift invariant points is configured to estimate the illumination values associated with the non-shift invariant points based, at least in part, on the illumination values associated with the shift invariant points that surround the non-shift invariant points and the estimated second order derivatives of the illumination values corresponding to the non-shift invariant points.

40. The system of claim 31, wherein the means for determining the color data is further configured to determine the color intensity data corresponding to non-shift invariant points based, at least in part, on the second order derivatives of the illumination values corresponding to the non-shift invariant points.

* * * * *

UNITED STATES PATENT AND TRADEMARK OFFICE
CERTIFICATE OF CORRECTION

| | | |
|---|---|---|
| PATENT NO. | : 8,213,710 B2 | Page 1 of 1 |
| APPLICATION NO. | : 11/998127 | |
| DATED | : July 3, 2012 | |
| INVENTOR(S) | : Dosluoglu | |

It is certified that error appears in the above-identified patent and that said Letters Patent is hereby corrected as shown below:

On the Title Page, Item (56), under "OTHER PUBLICATIONS", Line 4, delete "inventon." and insert -- invention. --, therefor.

In Column 2, Line 60, delete "points" and insert -- points. --, therefor.

In Column 3, Line 31, delete "points. from" and insert -- points from --, therefor.

In Column 5, Line 43, delete
"$l(n-k,m-l) \neq T[a*X(n-k,m-l)+b*X2(n-k,m-l\_+c*X3(n-k,m-l)+d*X4(n-k,m-l)]$" and insert
-- $l(n-k,m-l) \neq T[a*X1(n-k,m-l)+b*X2(n-k,m-l\_+c*X3(n-k,m-l)+d*X4(n-k,m-l)]$ --, therefor.

In Column 6, Line 50, delete "an 2e" and insert -- and 2e --, therefor.

In Column 7, Line 32, delete "is the" and insert -- the --, therefor.

In Column 10, Line 15, delete "formula;" and insert -- formula: --, therefor.

In Column 13, Line 18, delete "equations." and insert -- equations: --, therefor.

In Column 14, Line 45, delete "$lc(I,j,x)=lcx(i-k,j-l)+l(I,j)/2-l(i-2*l,j-2*l)/2-l(i,j)|/8$" and insert -- $lc(I,j,x)=lcx(i-k,j-l)+l(I,j)/2-l(i-2*l,j-2*l)/2-l(i,j)''/8$ --, therefor.

Signed and Sealed this
Eighth Day of January, 2013

David J. Kappos
*Director of the United States Patent and Trademark Office*